US011542923B1

(12) United States Patent
Messinger

(10) Patent No.: US 11,542,923 B1
(45) Date of Patent: Jan. 3, 2023

(54) WIND TURBINE NACELLE AND TOWER REDESIGN FOR EXTREME LOADS AND REMOTE SERVICING AND SURVEILLANCE DRONE

(71) Applicant: Samuel Messinger, Ramot Beit Shemesh Gimmel (IL)

(72) Inventor: Samuel Messinger, Ramot Beit Shemesh Gimmel (IL)

( * ) Notice: Subject to any disclaimer, the term of this patent is extended or adjusted under 35 U.S.C. 154(b) by 0 days.

(21) Appl. No.: 17/740,556

(22) Filed: May 10, 2022

(51) Int. Cl.
*F03D 80/80* (2016.01)
*F03D 80/50* (2016.01)
*F03D 9/25* (2016.01)

(52) U.S. Cl.
CPC ............ *F03D 80/82* (2016.05); *F03D 9/25* (2016.05); *F03D 80/50* (2016.05); *F03D 80/88* (2016.05); *F05B 2220/706* (2013.01); *F05B 2240/912* (2013.01)

(58) Field of Classification Search
CPC .......... F03D 80/82; F03D 80/88; F03D 80/50; F03D 9/25; F05B 2240/912
See application file for complete search history.

(56) References Cited

U.S. PATENT DOCUMENTS

| | | | | |
|---|---|---|---|---|
| 4,590,718 A * | 5/1986 | Angeloff | ............... | F03D 80/50 52/745.18 |
| 8,283,799 B1 * | 10/2012 | Thorpe | ............... | F03D 13/20 290/55 |
| 10,184,454 B2 * | 1/2019 | Monteiro De Barros | ............... | F03D 9/257 |
| 2011/0062718 A1 * | 3/2011 | Fernandez-Bueno | ............... | H02K 7/183 290/55 |
| 2012/0317918 A1 * | 12/2012 | Rasmussen | ............... | E04H 12/08 29/897.3 |
| 2013/0115054 A1 * | 5/2013 | Yokoyama | ............... | F03D 13/20 415/126 |
| 2015/0322919 A1 * | 11/2015 | Acosta-Nassar | ............... | F03D 1/0633 416/9 |
| 2016/0025072 A1 * | 1/2016 | Monteiro De Barros | ............... | F03D 15/00 415/121.3 |
| 2019/0003450 A1 * | 1/2019 | Provost | ............... | F03D 1/04 |
| 2019/0264661 A1 * | 8/2019 | Donescu | ............... | E02B 17/0034 |
| 2020/0392943 A1 * | 12/2020 | Messinger | ............... | F03D 7/0276 |

* cited by examiner

*Primary Examiner* — Sean Gugger

(57) ABSTRACT

A wind turbine system able to withstand up to 150 mph winds, comprising the electricity generating components moved from the nacelle to the top of the tower, positioned vertically, and comprising: a main-shaft bearing; a gearbox; a brake assembly; a high-speed shaft; a generator; and an electrical control cabinet. The purpose of positioning in the tower is to protect the components from high winds, tornados, etc. and to regulate the rotation of the propellers to make more electricity. The turbine can be easily repaired onsite by removing covers on the upper tower; and with snap in replacement parts. Drone, which are stored in the top horizontal housing, can surveil and protect the turbine and the surrounding area. And, solar panels on the sides and/or cover of the top horizontal housing provide energy to the turbine in low and no wind conditions.

18 Claims, 8 Drawing Sheets

WIND TURBINE NACELLE AND TOWER REDESIGN FOR EXTREME LOADS AND REMOTE SERVICING AND SURVEILLANCE DRONE

FIELD OF THE INVENTION

The present invention relates to a wind turbine system with the mechanical-electrical components that generate electricity moved from the hub-nacelle to the upper tower to reduce exposure to adverse climate, to maximize electricity production, and to enable easier servicing of parts.

BACKGROUND OF THE INVENTION

A wind turbine is a device that converts the kinetic energy of wind into electrical energy using a simple principle that the energy in the wind rotates the propeller like blades of the rotor of the turbine, which is normally connected to the rotor shaft of the generator using the main shaft and which spins the rotor shaft of the generator creating electricity from the kinetic energy of the wind. Based on the design of the rotor, wind turbines are conventionally classified as Horizontal axis wind turbine and Vertical axis wind turbine. The rotation of the propellers is often 15 rpm, which is converted through mechanical gears and bearings to 1800 rpm to produce electricity. To date the propellers have been designed exclusively for their aerodynamic properties, such as for aircraft application.

Placement of a wind turbine tower is usually in a permanent location that is now subject to global warming weather fluctuations, which include frequent hurricane type winds and tsunami forces. Often this subjects the wind turbine structure and parts as gears and bearings to shock loads not originally anticipated. As an example, General Electric, which is a major supplier of wind turbines, has had a plurality of unexplained wind turbine failures, to include tower bending collapses. GE Haliade-X 13MW has a 65 ton nacelle atop the tower.

Therefore, there exists a need for a wind turbine system that can withstand up to 150 mile per hour (mph) winds (e.g. not be damaged in hurricanes). It should also have easy access to repair and replace the electrical-mechanical components for electricity generation and to reduce their exposure to adverse climate. And the wind turbine system should be able to be controlled remotely, and/or automatedly for the safe rate of propeller rotation.

SUMMARY OF THE INVENTION

This summary is provided to introduce a selection of concepts in a simplified form that are further disclosed in the detailed description of the invention. This summary is not intended to identify key or essential inventive concepts of the claimed subject matter, nor is it intended for determining the scope of the claimed subject matter.

The present invention comprises a wind turbine system able to withstand high velocity winds up to 150 mph, comprising: 1) a propeller assembly comprising: a) a hub, centrally located; b) a plurality of propeller blades, equally spaced around and connected to the hub; and, c) a top horizontal housing connected rearward of the hub, storing: a controller, an anemometer, and a wind vane. The wind turbine system further comprises: 2) a tubular tower positioned beneath and connected to the top horizontal housing, comprising: a) a stiff upper tower housing a plurality of vertically positioned electrical-mechanical components able to convert mechanical or kinetic energy into electrical energy; b) a lower tower comprising a mechanism to refuel or to change oil and other lubricants in the tower; and c) a flat base able to support the weight of, and stabilize the wind turbine system.

In an embodiment, the wind turbine system comprises that the stiff upper tower is further divided into a plurality of cylindrical segments comprising a removable for each segment.

In an embodiment, the tower further comprises at least one interior support comprising support bars positioned cross-sectionally within tower to provide stability and prevent damage from high winds.

In an embodiment, the tower further comprises at least two cylindrical segments adjoined end-to-end via internal, perpendicular flanges and Grade 8 bolts.

In an embodiment, the wind turbine system comprises that within a top cylindrical segment—the electrical-mechanical components able to convert mechanical or kinetic energy to electrical energy, the electrical-mechanical components comprising: a main-shaft bearing; a gearbox; a brake assembly; a high-speed shaft; a generator; an electrical control cabinet; and cooling cabinets.

In an embodiment, the wind turbine system comprises that the hub is positioned horizontally with a horizontal propeller shaft and gear; and it is connected to a vertical shaft and gear, and said vertical shaft and gear are connected below to the vertically positioned electrical-mechanical components.

In an embodiment, the wind turbine system comprises that within a middle segment or a bottom segment, the system comprises: a gear box regulator able to control the rotation of the propellers.

In an embodiment, the wind turbine system comprises that the lower tower is cylindrically shaped with increasing or uniform diameter near the flat base; and the mechanism to refuel or change the oil comprises: a wirelessly controlled door covering a refueling pump, able to be attached to a refueling boat or helicopter via a fuel line.

In an embodiment, the wind turbine system comprises a three solid propeller blades, or three hollow blades. At least one hollow blade comprises: a fluid reservoir on opposing ends of the blade, connected by a fluid line running through a middle hydraulic pump.

In an embodiment, the top horizontal housing further comprises at least one drone with wireless cameras or weaponry for surveilling and protecting the wind turbine system and the surrounding areas. And it may further comprise a remote-controlled door or cover, able to open and close when the drone is taking off or landing.

In an embodiment, the top horizontal housing further comprises: a) at least one wireless shaft rotation monitor sensor, configured to monitor and transmit an angle and position of the propeller shaft to the wireless control transmitter units; and b) wherein the anemometer is attached at a rear portion of top horizontal housing and positioned to monitor and transmit a speed of the wind to the wireless control transmitter units.

In an embodiment, the top horizontal housing further comprises: one or more solar panels to power the wind turbine system when there is no wind or low wind conditions comprising about 0 to 15 km/hr.

In an embodiment, the top horizontal housing or the upper tower segment comprises a yaw system comprising a yaw drive and a yaw motor.

In an embodiment, the hub further comprises a wireless pitch control system.

In one or more embodiments, the wind turbine system comprises the traditional electrical-mechanical components that generate the electricity, which are normally located horizontally behind the hub in the nacelle housing, are now positioned substantially vertically in the upper tower. These components are now housed in what is referred to as a "modified nacelle assembly".

This invention seeks to strengthen the wind turbine through the rearranging of the major components of the nacelle to protect them from these occurrences and for general strengthening of the tower, usually with S-355 steel.

An embodiment of this invention is to redesign the wind tower turbine for easier maintenance through a system of remote access to change lubrication and filters.

In another embodiment, routine servicing of bearings, gears and seals and other items several oil/air filters are on a sprocket for rotating replacement remotely. To avoid the necessity of expensive manual servicing which often exposes the worker to risks and dangers in remote locations.

In another embodiment, a heavy-duty gear automatic transmission, such as used in a motor freight industry with multiple 15 gears, replace the standard nacelle gear box, which takes the propeller from 15 rpm to 1800 rpm within the tower to sustain the increased tsunami and hurricane loads.

In another embodiment, the tower is reinforced and strengthened with riveted plates conforming to the tower profile to withstand the hurricane and tsunami winds, wherein the maximum wind forces are about 35 feet up for the tower bottom.

In another embodiment, parts are easily serviced or replaced inside the tower through vertical tower access and the strategic placement of parts.

In another embodiment, the tower is remotely serviced from a water location, e.g. by boat.

In another embodiment, the wind turbine is serviced by air (helicopter) using a flying boom mating with a wireless controlled side tower receptor.

In another embodiment, a service robot removes filters and performs the basic maintenance, such as rotating the filters.

In another embodiment, a command central operates 24/7 to remotely monitor and control the wind turbine.

In another embodiment, electrical components are designed to be easily removed, replaced, and repaired through snap-in attachments.

BRIEF DESCRIPTION OF DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and structures disclosed herein. The description of a method step or a structure referenced by a numeral in a drawing is applicable to the description of that method step or structure shown by that the same numeral in any subsequent drawing herein.

DETAILED DESCRIPTION OF INVENTION

The present invention overcomes the aforesaid drawbacks of the above, and other objects, features and advantages of the present invention will now be described in greater detail. Also, the following description includes various specific details and is to be regarded as merely exemplary. Accordingly, those of ordinary skill in the art will recognize that: without departing from the scope and spirit of the present disclosure and its various embodiments there may be any number of changes and modifications described herein.

As used herein, the term "Propeller Assembly" comprises a hub and a plurality of solid propellers connect to the hub, equally spaced. To the rear of and connected to the hub is the nacelle, horizontally positioned.

As used herein, the term "Modified Nacelle" refers to the part of the wind turbine that houses the electrical-mechanical components that transform the wind's kinetic energy into mechanical energy to turn a generator that produces electricity. Most nacelle components in the present invention are moved from behind the hub to the upper tower, in a vertical position.

As used herein, the term "Top Horizontal Housing" refers to the unit positioned horizontally behind the hub, formerly known in the art as the nacelle, and in the present invention housing at least: an anemometer, a yaw drive, a yaw motor, a controller, and a wind vane. Remaining space can be used for drone storage, which requires a door on the nacelle that can be opened and closed remotely, and wirelessly; or no cover on the housing. One or more solar panels are also affixed to the housing, in an embodiment, to power the turbine in low or no wind conditions, e.g. 0-15 km/hr; 15-30 km/hr, etc.

As used herein, the term "electrical-mechanical electricity generating components" or the "electricity generating components" refers to the parts of the wind turbine normally housed within the nacelle that in the present invention are housed in the upper tower as the modified nacelle. The electrical-mechanical components transform the wind's kinetic energy into mechanical energy to turn a generator that produces electricity. Various configurations are envisioned in the present invention, each comprising at least a: main-shaft bearing, gearbox, generator, and electrical control cabinet.

Wind Turbine System 100

Propeller Assembly 10

Figure 1:
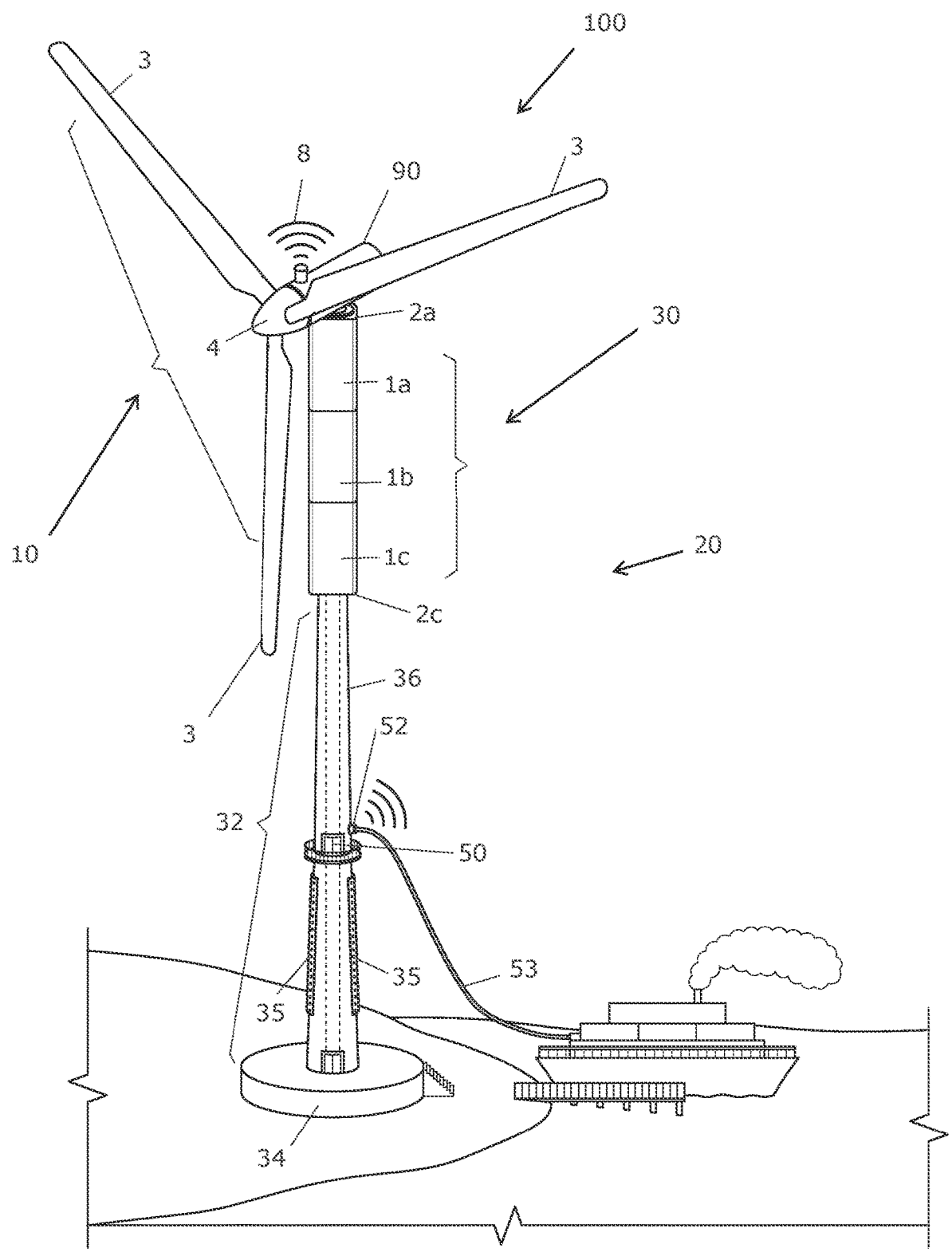
FIG. 1 illustrates a left side perspective view of the wind turbine system with a propeller comprising three equally spaced, solid blades and the electrical-mechanical electricity generating components in the upper tower, and being refueled via a boat.
Figure 2:
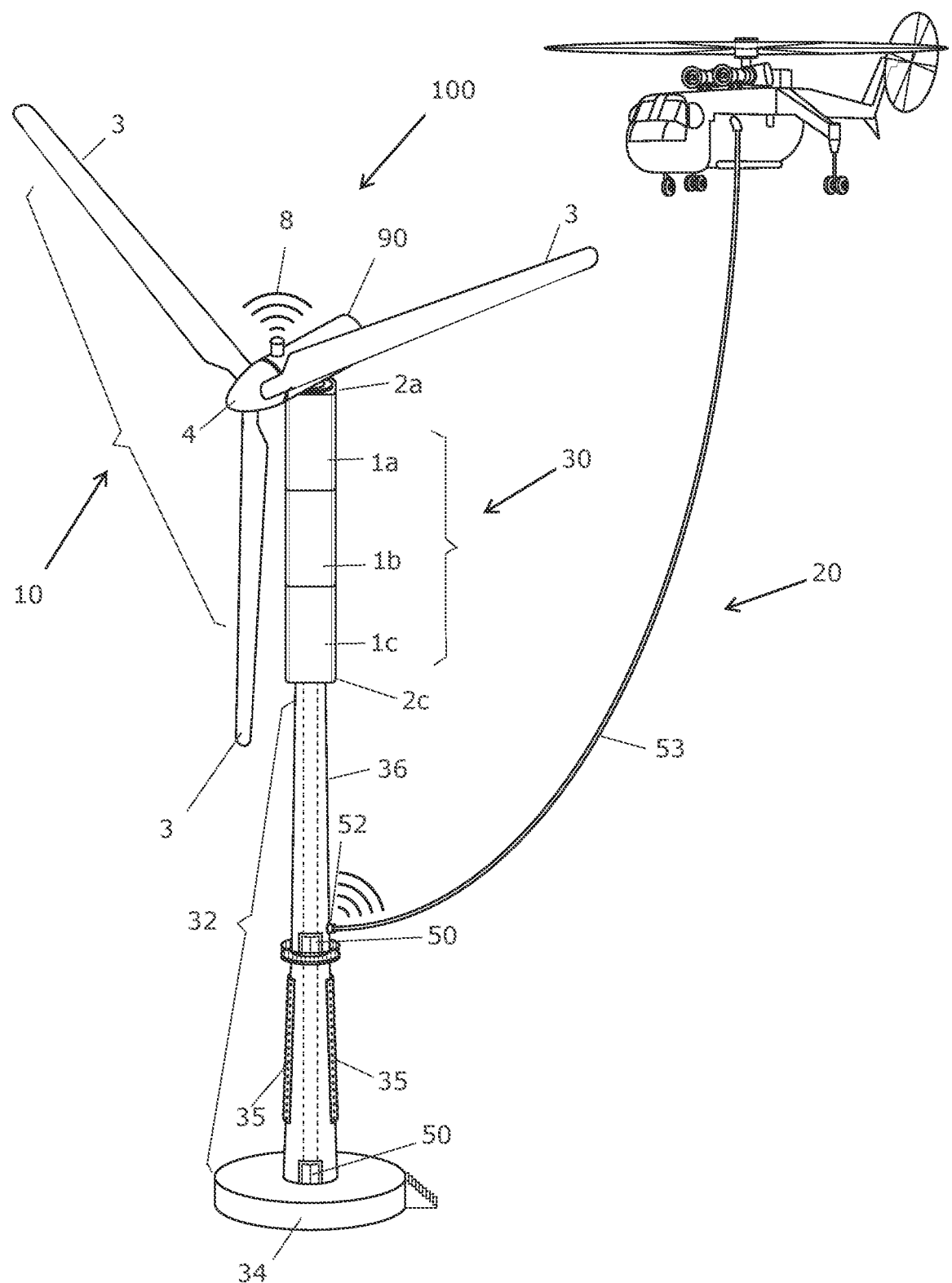
FIG. 2 illustrates a left side perspective view of the wind turbine system with a propeller comprising three equally spaced solid blades and the electrical-mechanical electricity generating components in the upper tower, and being refueled via an industrial helicopter.

Now, referring to FIGS. 1-2, the wind turbine system 100 comprises: a propeller assembly 10 comprising a central hub 4 encircled by a plurality of (hollow or solid) equally spaced propeller blades 3. Hub 4 is horizontally positioned; blades 3 are positioned perpendicular to the hub; and the propeller assembly is positioned atop the tubular tower 20. In an embodiment, the propeller blades 3 are solid blades well known in the art; and the propeller operates at 15-25 revolutions per minute (rpms) to generate 1800 rpms within modified nacelle 70 in the upper tower.

Figure 3A:
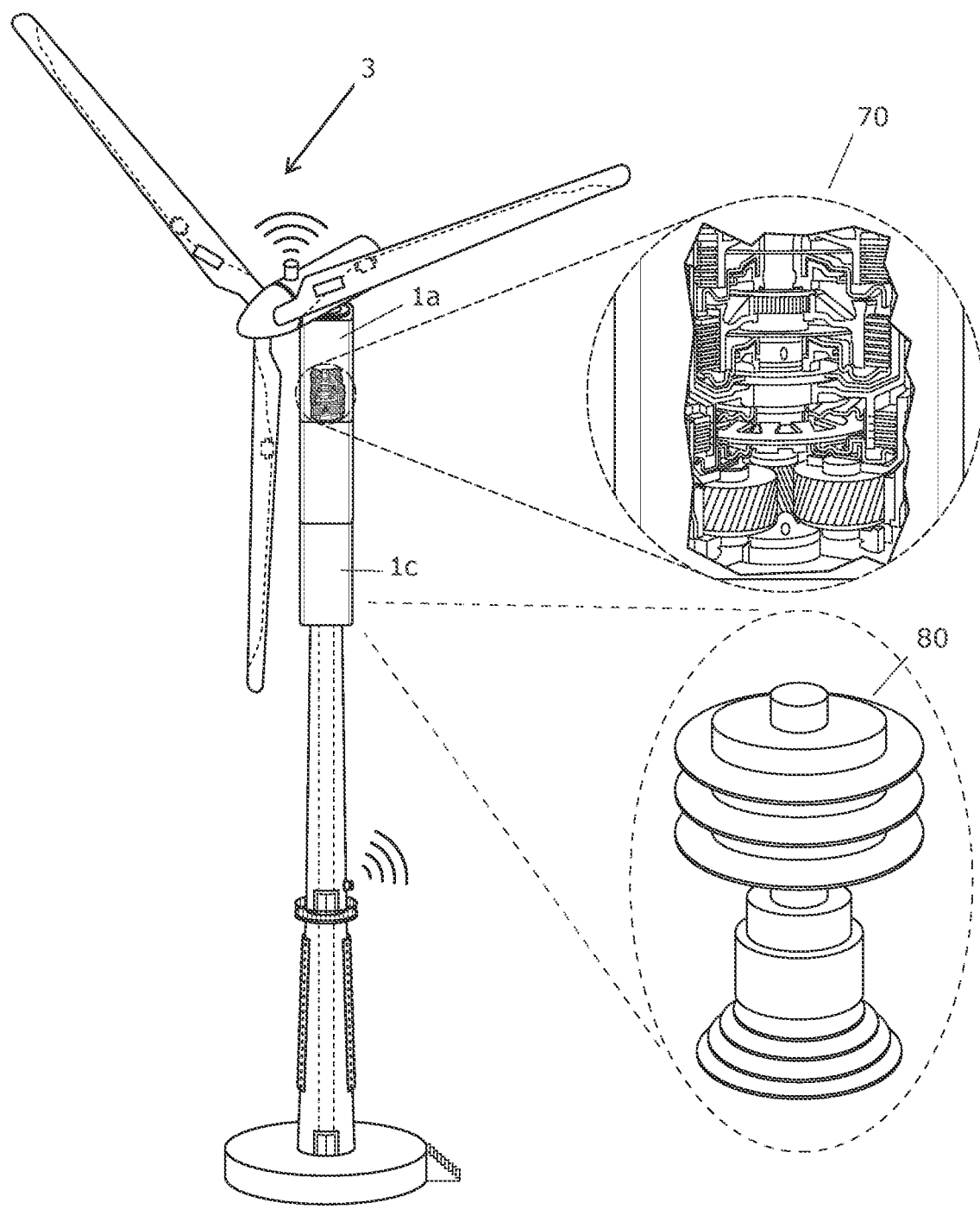
FIG. 3A illustrates a left side perspective view of the wind turbine system comprising hollow propeller blades with a pair of reservoirs and a hydraulic pump in each blade; and with one exemplary embodiment of the electrical-mechanical electricity generating components and a gearbox regulator in the upper tower section.
Figure 3B:
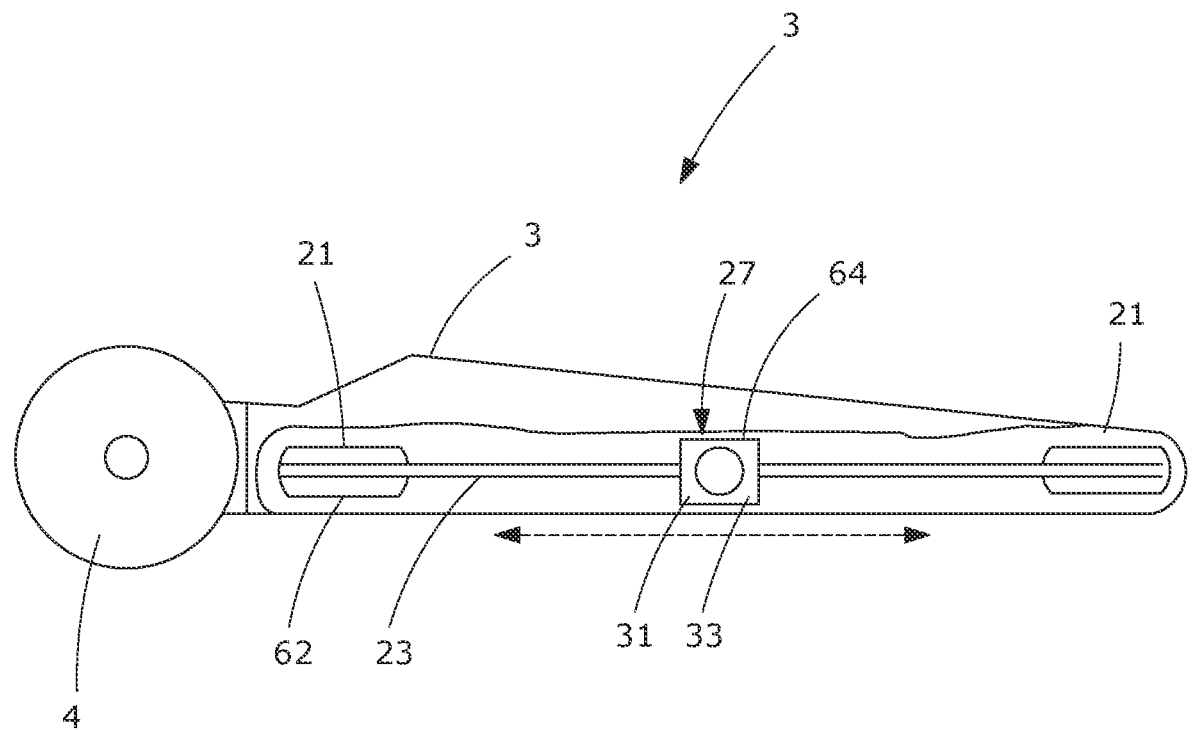
FIG. 3B illustrates the view of FIG. 3A, comprising hollow propeller blades with a pair of reservoirs and a hydraulic pump in each blade to control the propeller speed by pumping fluid between blade ends during specific points in propeller rotation.

Hollow blades are also envisioned for use in the present invention, such as disclosed by the current inventor in: U.S. Pat. No. 10,975,842 B2 that issued Apr. 13, 2021, and U.S. Pat. No. 11,215,164 B2 that issued Jan. 4, 2022. These hollow blades comprise a pair of fluid reservoirs positioned on opposing ends of each blade, with a hydraulic pump positioned between them, as shown in FIG. 3. The pump moves the fluid between the reservoirs to control the speed of the propeller when there is no or low wind conditions, or excessively high winds, to prevent damage to the turbine. As illustrated in the embodiment FIG. 3B, hollow propeller blade 3 comprises a pair of opposing fluid reservoirs 21; and a middle connection unit 27 housing a hydraulic pump 31 with a wireless control unit 33. The connection unit 27 may further comprise a fluid heater 62 and/or a rechargeable battery 64 to power the pump. Alternatively, and as illustrated in FIG. 3B, the fluid heater 62 may reside in a fluid reservoir or in the top horizontal housing 90. The wireless control unit 33 receives wind speed and propeller shaft position data from the anemometer 20 and sensor 50 (see FIG. 6A, 26) and controls the operation of pump 31 according to that received data. The fluid reservoirs 21 are connected by a fluid line 23 that runs through the hydraulic pump 31.

Tubular Tower 20

As illustrated in FIGS. 1-2, tubular tower 20 is divided into a stiff upper tower 30 and a lower tower 32. Upper tower 30 is divided into a plurality of cylindrical segments (e.g., 1a, 1b, 1c, etc.). In an embodiment, cylindrical tower segments 1 comprise C-355 steel. Each segment 1 may further comprise a removable cover (2a, 2b, 2c), for easy access when repair and maintenance work is required on the modified nacelle. For example, removeable covers comprise snap on covers, or swing doors, and/or the electrical-mechanical components in units 70 and 80 that are replaced are snap in parts. And in an embodiment, removeable covers 2 (or sleeves) comprise hardened steel of Rockwell shore hardness (Rc) 30-34.

Segments 1 also allow for: 1) enhanced stability of the turbine due to the stiff material in the upper tower 30, including the segment covers 2; 2) easier assembly of the wind turbine, e.g. after transporting to the final location; and 3) easier maintenance of the electrical-mechanical components by removing segment covers 2.

In an embodiment, lower tower 32 is cylindrical with increasing diameter, or of uniform diameter, and is fixed to base 34, such as a horizontal concrete platform that is able to support the weight of the wind turbine. In an embodiment, lower tower 32 further comprises an access door mechanism 50 for accessing fuel and oil deposits to easily replace or replenish them. For example, this may comprise a door 50 covering a refueling pump 52, in which both are able to be opened and closed remotely (wirelessly). This allows refueling from both boat (e.g. FIG. 1) and air (e.g. FIG. 2) with a refueling line 53 extending from pump 52 to the boat or aircraft.

In an embodiment, lower tower 32 further comprises opposing steel plates 35 covering the outside of the surface to reinforce the tower strength. The plates must be at located at least 35 feet above the base 34, which is where the strongest wind forces are normally encountered.

A power or electric cable 36 also runs the length of the tower to transmit electricity generated at modified nacelle 70 to a usage or storage point for the electricity (e.g. a local electrical grid or substation); or to an energy storage area (e.g. solid-state batteries, ultra or super-capacitors, Flywheels, Pumped Hydroelectric Storage Dams, Rail Energy Storage, and Compressed Air Storage, etc.).

Figure 4:
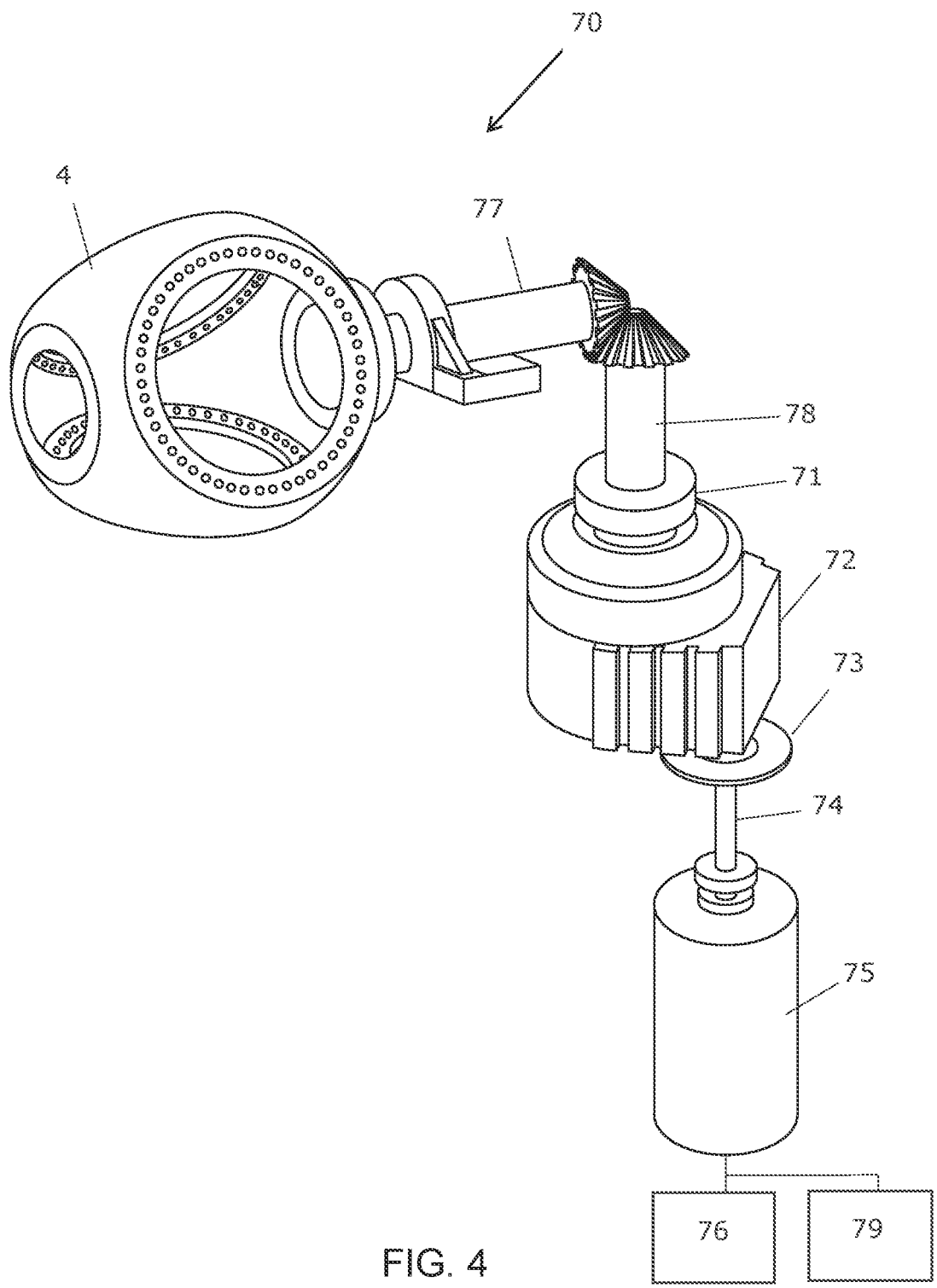
FIG. 4 illustrates another embodiment of the electricity generating components within the upper tower.

As illustrated in FIGS. 3 and 4, at least one of the segments (e.g., 1a) houses the modified nacelle 70, which comprises a plurality of electrical-mechanical components for the generation of the electricity. In the prior art, the electrical-mechanical components are positioned horizontally within the nacelle and behind the hub, whereas in the present invention they are positioned vertically in upper tower 30. As shown in FIG. 4, electrical-mechanical components 70 are able to convert mechanical or kinetic energy to electrical energy, and comprise: a horizontal rotatable shaft 77 with an end funnel like gear that is connected to hub 4 on one end and to a vertical rotatable shaft 78 with another end funnel like gear. As shown in FIG. 4, gears 77 and 78 are connected to so that the hub's rpms control the rpms of shaft 78. Electrical-mechanical components 70 further comprise shaft 78 connected on a bottom end to a main-shaft bearing 71; a gearbox 72 with gears; a brake assembly 73; a high-speed shaft 74; a generator 75; and an electrical control cabinet 76, and cooling cabinets 79. In an embodiment, the gears are heavy duty 15, such as used in heavy duty truck transmissions.

As illustrated in FIG. 3, the tower's lower segment 1b or 1c house unit 80 comprising a gear box regulator to control the rotation of the propellers.

The electrical-mechanical components within units 70 and 80 may be replaced with snap in units for easy repair, including robotically. Robots used to service the wind turbine can be deployed by drones, boats or aircraft, for example. These unique uses may open locations for wind turbine placement and power generation in areas that were otherwise restricted or protected by law. Snap-in repairs units are well known in the art, such as: the ABB-Converter®; the Aurora-Inverter-Wind; and the Eaton-Inverter-Wind®.

Lubrication barrels in the lower tower (e.g. behind remotely operated door 50) automatically service split bearings and split gears for easy removal/replacement at various heights in tower. Lubricant tanks drawn filters have a sprocket carousel holding 3-5 filters to accommodate lubricant servicing. Lubrication tanks are serviced every 90 days. There is a three-year oil supply in the tower, in an embodiment. And rotating oil filter fittings are used, in an embodiment.

Figure 5A:
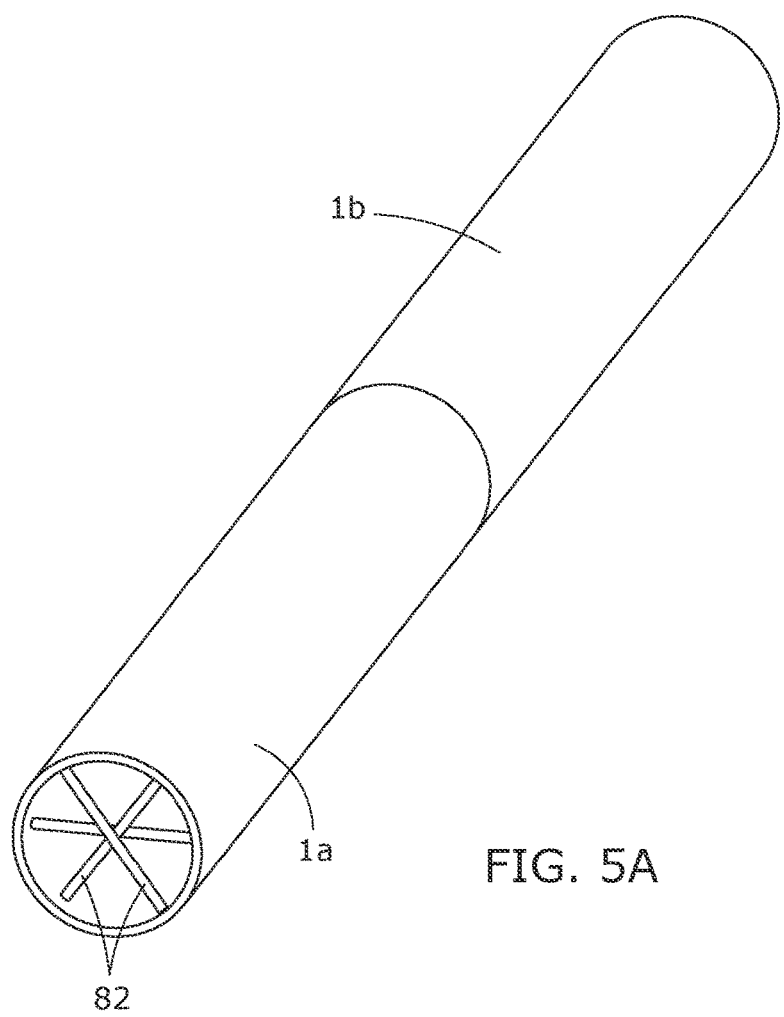
FIG. 5A illustrates a cross-sectional view of the tower comprising a plurality of intersecting support bars positioned cross-sectionally within tower to provide stability and prevent damage from high winds.

As illustrated in FIG. 5A, the interior of the tower may further comprise one or more support beams comprising a plurality of crisscrossed bars extending the cross-sectional area of the tower. These support beams 82 help maintain the tower's shape when it is subjected to strong winds, and during transport. There are many instances of towers bending near the top from such winds. In an embodiment, the tower is made from S335 steel.

Figure 5B:
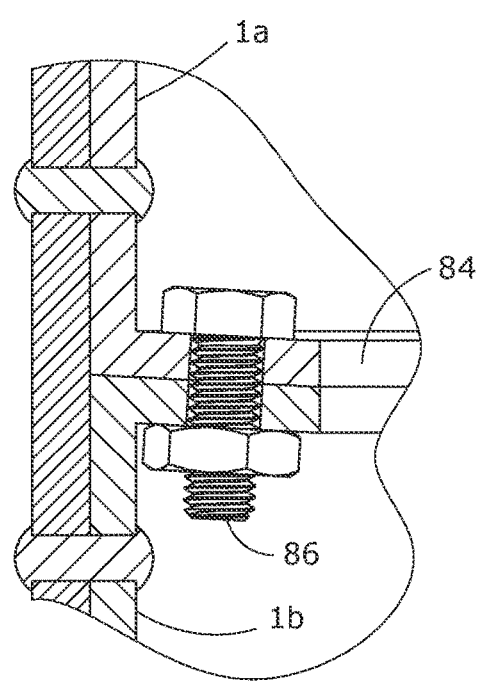
FIG. 5B illustrates internal flanges positioned to secure two adjoining tower sections together.

Furthermore, the tower may comprise multiple cylindrical units or segments (e.g. 1a, 1b, etc.), which fit end-to-end, for ease of transport. The units may be fixed in place using rigid supports affixed on both the upper and lower unit, such as the flanges 84 and Grade 8 bolts 86 shown in FIG. 5B.

Top Horizontal Housing 90

Figure 6A:
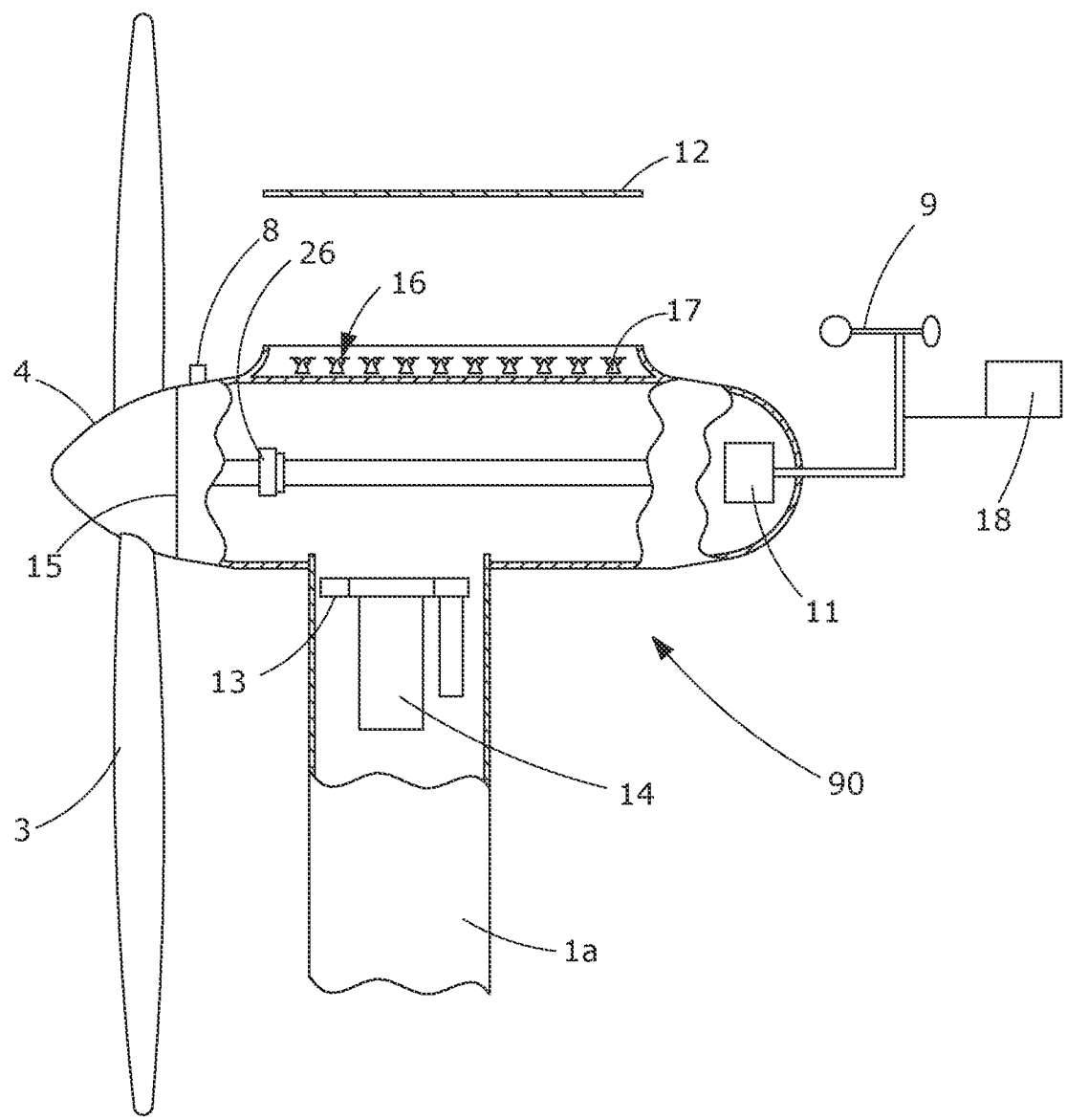
FIG. 6A is a side view of the interior of the top horizontal housing comprising: the yaw system, anemometer, wind vane, and a plurality of drones deployable from the top.
Figure 6B:
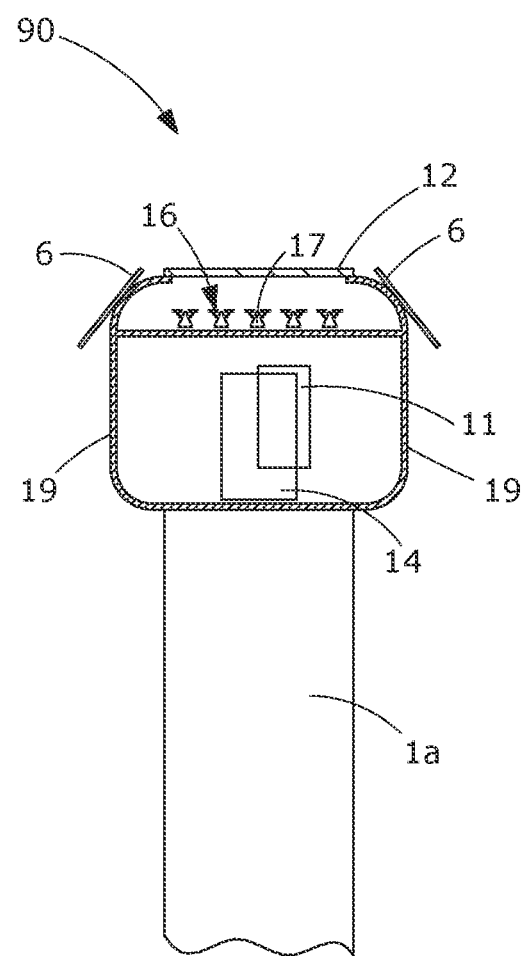
FIG. 6B is a rear view of FIG. 6A further illustrating solar panels on the sides to generate power for the propeller in no and low wind conditions.

FIGS. 6A and 6B are illustrations of the top horizontal housing 90 comprising an anemometer 9, a wind vane 18, a controller 11, and optionally at least one drone 16. The drones may comprise cameras 17 able to wirelessly transmit in real-time videos of the surrounding area and the wind turbine. In another embodiment, the drones may comprise weaponry to fire on threatening forces to defend the wind turbine from damage.

Housing 90, or the top of the tower (as shown in FIG. 6A), further comprises: a yaw drive 13 and a yaw motor 14. And hub 4 further comprises pitch control system 15.

Top horizontal housing 90 or hub 4 further comprise at least one wireless shaft rotation monitor sensor attached a rotation shaft, and a configured to monitor and transmit an angle and position of the propeller shaft to the wireless control transmitter units 8 that are positioned on the top surface of housing 90. And anemometer 9 is attached at a rear portion of top horizontal housing positioned to monitor and transmit a speed of the wind to the wireless control units 8. Thus, the speed of the propellers can be remotely monitored.

As shown in FIG. 6B, top horizontal housing 90 may further comprise at least one solar panel 6 on the top 12 and/or sides 19 of the housing as a backup energy source to keep the propellers moving in no or low winds.

In an embodiment, the top horizontal housing 90 has a flat top with a cover 12 comprising a remote-controlled pivoting door to allow drones to fly off and land. In another embodiment, the top horizontal housing 90 has no top cover 12 to allow surveillance drones to store, land, and take off without having to activate a cover 12.

Wind turbines are strategic targets in any conflict. As of now they are defenseless against any attack. Power from wind turbines supports both military and civilian infrastructure. The present invention provides an empty top horizontal housing space as an area for reconnaissance drones and/or armed drones to protect the wind turbine and the surrounding areas. Often wind turbines are located in remote locations that offer other security enhancements, such as surveillance of protected rain forests, tracking animal poachers (endangered species) toxic landfills and sensitive areas.

CONCLUSION

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein The transitional term "comprising", which is synonymous with "including," "containing," or "characterized by," is inclusive or open-ended and does not exclude additional, unrecited elements or method steps. The transitional phrase "consisting of" excludes any element, step, or ingredient not specified in the claim. The transitional phrase "consisting essentially of" limits the scope of a claim to the specified materials or steps "and those that do not materially affect the basic and novel characteristic(s)" of the claimed invention.

Or, the technology illustratively described herein suitably may be practiced in the absence of any element(s) not specifically disclosed herein. Thus, for example, in each instance herein any of the terms "comprising," "consisting essentially of," and "consisting of" may be replaced with either of the other two terms.

The term "a" or "an" can refer to one of or a plurality of the elements it modifies (e.g., "a reagent" can mean one or more reagents) unless it is contextually clear either one of the elements or more than one of the elements is described. The term "about" as used herein refers to a value within 10% of the underlying parameter (i.e., plus or minus 5%), As used herein, the term "substantially" refers to approximately the same shape as stated.

While several embodiments of the disclosure have been described, it is not intended that the disclosure be limited thereto, as it is intended that the disclosure be as broad in scope as the art will allow and that the specification be read likewise. Therefore, the above description should not be construed as limiting, but merely as exemplifications of embodiments.

Trademarks: the product names used in this document are for identification purposes only; and are the property of their respective owners.

What is claimed is:

1. A wind turbine system able to withstand high velocity winds up to 150 mph, comprising:
   a propeller assembly (10) comprising:
   a) a hub (4), centrally located, and positioned horizontally;
   b) a plurality of propeller blades (3), equally spaced around, and connected to the hub; and,
   c) a top horizontal housing (90) connected rearward of the hub, storing comprising: a controller (11), an anemometer (9), and a wind vane (12);
   a tubular tower (20) positioned vertically beneath and connected to the top horizontal housing (90), comprising:
   a) a stiff upper tower (30) housing a plurality of vertically positioned electrical-mechanical components (70) able to convert mechanical or kinetic energy into electrical energy, comprising: a horizontal rotatable shaft and gear (77) connected to a vertical rotatable shaft and gear (78); a main-shaft bearing (71); a gearbox (72); a brake assembly (73); a high-speed shaft (74); and a generator (75);
   b) a lower tower (32) comprising a mechanism to change oil in the tower; and
   c) a flat base (34) able to support the weight of the wind turbine system.

2. The wind turbine system of claim 1, wherein the stiff upper tower (30) is further divided into a plurality of cylindrical segments (1a, 1b, 1c), each cylindrical segment comprising a removable cover (2a, 2b, 2c).

3. The wind turbine system of claim 2, wherein the electrical-mechanical components (70) that are able to convert mechanical or kinetic energy to electrical energy are stored in the cylindrical segment (1*a*) and further comprises: an electrical control cabinet (76); and one or more cooling cabinets (79).

4. The wind turbine system of claim 1, wherein the hub is connected to the horizontal rotatable shaft and gear (77); and a hub revolution per minute (rpms) controls the vertical rotatable shaft and gear (78) revolutions per minute (rpms).

5. The wind turbine system of claim 2, further comprising within a middle segment (1*b*) or a bottom segment (1*c*) comprising: a gear box regulator (80) able to control the rotation of the propeller blades.

6. The wind turbine system of claim 1, wherein the lower tower (32) is cylindrically shaped with increasing or uniform diameter near the flat base (34); and the mechanism to refuel or change the oil comprises: a wirelessly controlled door (50) covering a refueling pump (52), able to be attached to a refueling boat or helicopter via a fuel line (53).

7. The wind turbine system of claim 1, wherein the plurality of propeller blades comprises three solid blades.

8. The wind turbine system of claim 1, wherein the plurality of propeller blades comprises three hollow blades, each blade comprising a fluid reservoir (21) on opposing ends of the blade, connected by a fluid line (23) running through a middle hydraulic pump (25).

9. The wind turbine system of claim 1, wherein the top horizontal housing further comprises at least one drone (16) with wireless cameras or weaponry (17) for surveilling and protecting the wind turbine system and the surrounding areas.

10. The wind turbine system of claim 9, wherein the top horizontal housing further comprises a remote-controlled door (12) able to open and close when the drone (16) is taking off or landing.

11. The wind turbine system of claim 1, the top horizontal housing further comprising:

a) at least one wireless shaft rotation monitor sensor (26), configured to monitor and transmit an angle and position of the propeller shaft to a wireless control transmitter unit (8); and b) wherein the anemometer is attached at a rear portion of top horizontal housing and positioned to monitor and transmit a speed of the wind to the wireless control transmitter unit (8).

12. The wind turbine system of claim 1, wherein the top horizontal housing further comprises one or more solar panels.

13. The wind turbine system of claim 1, wherein the tower comprises at least one centered interior support comprising support bars (82) positioned by extending cross-sectionally within tower (20) to provide stability and prevent damage from high winds.

14. The wind turbine system of claim 1, wherein the tower comprises at least two cylindrical segments (1*a*, 1*b*, 1*c*, and/or 32) adjoined end-to-end via internal, perpendicular flanges (84) and Grade 8 bolts (86).

15. The wind turbine system of claim 1, wherein a yaw drive (13) and a yaw motor (14) are located within the top horizontal housing (90) or at the top of the tower (20).

16. The wind turbine system of claim 1, wherein the hub further comprises a wireless pitch control system (15).

17. The wind turbine system of claim 1, wherein the hub or the top horizontal housing further comprises a pitch control system (15).

18. The wind turbine system of claim 1, wherein the electrical-mechanical components comprise snap-in units for easy repair and replacement of said electrical-mechanical components.

\* \* \* \* \*